(12) United States Patent
Haugan

(10) Patent No.: US 8,454,726 B2
(45) Date of Patent: Jun. 4, 2013

(54) $CO_2$ ABSORBENT AND METHOD FOR $CO_2$ CAPTURE

(75) Inventor: Thomas Ranes Haugan, Haslum (NO)

(73) Assignee: Aker Clean Carbon AS, Oslo (NO)

( * ) Notice: Subject to any disclaimer, the term of this patent is extended or adjusted under 35 U.S.C. 154(b) by 364 days.

(21) Appl. No.: 12/919,387

(22) PCT Filed: Feb. 26, 2009

(86) PCT No.: PCT/NO2009/000065
§ 371 (c)(1),
(2), (4) Date: Sep. 2, 2010

(87) PCT Pub. No.: WO2009/108064
PCT Pub. Date: Sep. 3, 2009

(65) Prior Publication Data
US 2011/0005390 A1    Jan. 13, 2011

(30) Foreign Application Priority Data
Feb. 28, 2008   (NO) .................................. 20081053

(51) Int. Cl.
*B01D 46/30*    (2006.01)

(52) U.S. Cl.
USPC .......... 95/27; 95/28; 95/108; 95/139; 95/187; 95/191; 95/230

(58) Field of Classification Search
USPC ................ 95/27, 28, 108, 139, 187, 191, 230
See application file for complete search history.

(56) References Cited

U.S. PATENT DOCUMENTS

| | | | |
|---|---|---|---|
| 2,818,323 A * | 12/1957 | Haensel | 423/228 |
| 2,823,765 A | 2/1958 | Maslan | |
| 4,112,051 A | 9/1978 | Sartori et al. | |
| 4,397,660 A | 8/1983 | Van der Pas-Toornstra | |
| 4,554,088 A * | 11/1985 | Whitehead et al. | 252/62.54 |
| 4,810,266 A | 3/1989 | Zinnen et al. | |
| 4,942,734 A | 7/1990 | Markbreiter et al. | |
| 5,061,465 A | 10/1991 | Carter | |
| 5,087,597 A | 2/1992 | Leal et al. | |
| 5,507,848 A | 4/1996 | Beckman | |
| 5,528,811 A | 6/1996 | Abidin et al. | |
| 2001/0043881 A1 | 11/2001 | Wagner et al. | |
| 2006/0076229 A1 | 4/2006 | Mazyck | |

FOREIGN PATENT DOCUMENTS

| | | |
|---|---|---|
| EP | 0003905B1 A1 | 9/1979 |
| WO | WO-02/069351 A1 | 9/2002 |
| WO | WO-2004/054708 A2 | 7/2004 |
| WO | WO-2007/057570 A1 | 5/2007 |
| WO | WO-2007/065933 A1 | 6/2007 |
| WO | WO-2008/110676 A2 | 9/2008 |

OTHER PUBLICATIONS

Hilgenga, Klaas, "International Search Report" for PCT/NO2009/000065 as mailed Apr. 27, 2009, 4 pages.

Leal, O., et al., "Reversible adsorption of carbon dioxide on amine surface-bonded silica gel", Elsevier Science S.A., Inorganica Chimica Acta 240, 1995, pp. 183-189.

* cited by examiner

*Primary Examiner* — Robert A Hopkins
(74) *Attorney, Agent, or Firm* — Winstead PC

(57) ABSTRACT

A solid absorbent for absorption of $CO_2$ from flue gas, comprising: a) particles made of a cross bounded, highly porous polymer substrate, and b) $CO_2$ absorbing functional nucleophilic groups grafted on the particle surface, is described. A method for $CO_2$ sequestration using the absorbent is also described.

4 Claims, 2 Drawing Sheets

US 8,454,726 B2

CO$_2$ ABSORBENT AND METHOD FOR CO$_2$ CAPTURE

TECHNICAL FIELD

Figure 1:
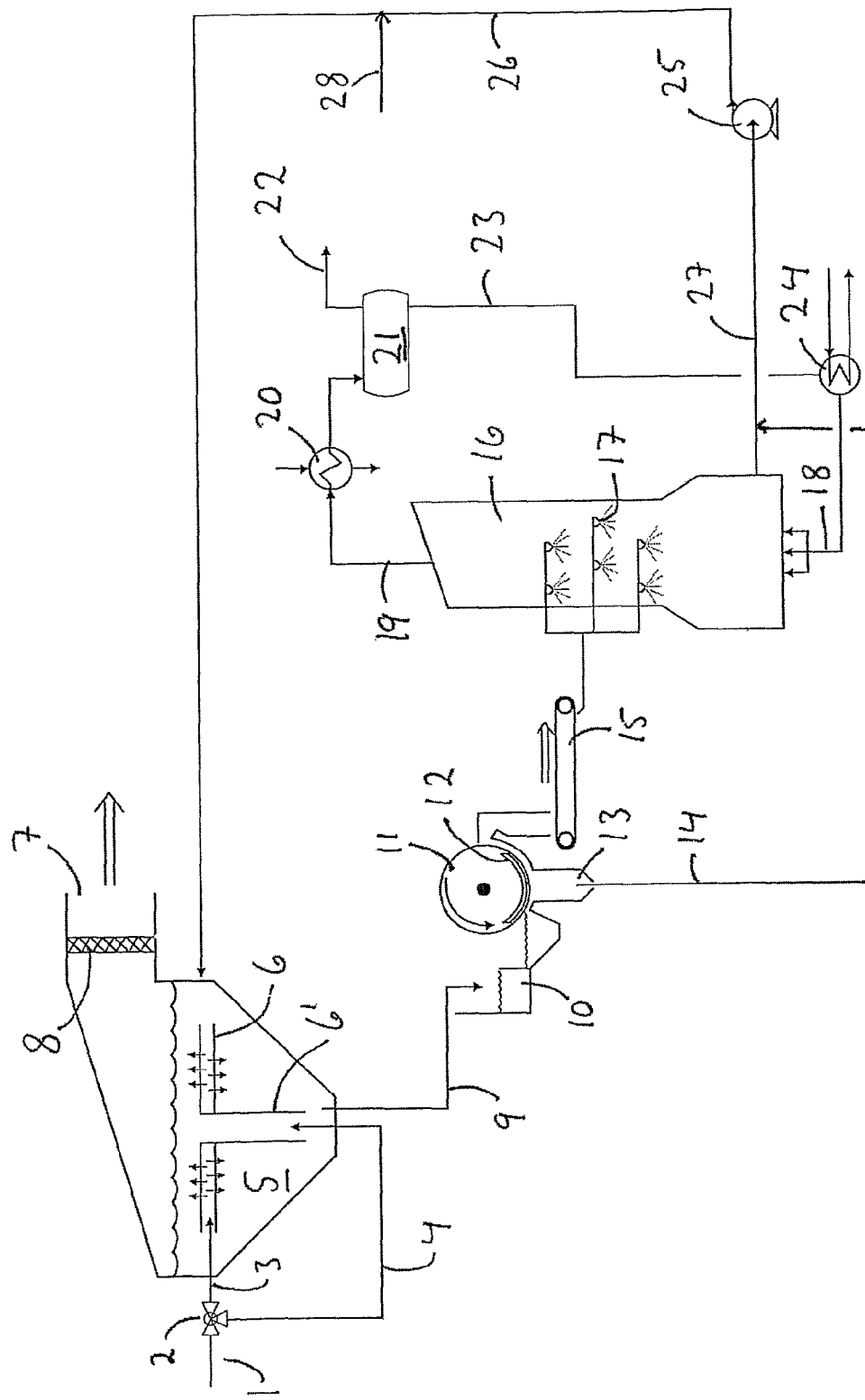

The present invention relates to the field of CO$_2$ capture from a gas mixture. More specifically the present invention relates to CO$_2$ capture from a CO$_2$ containing gas, such as combustion gas from combustion of carbonaceous material or from other CO$_2$ liberating processes. The present invention also relates to an improved adsorbent and plant for regeneration of a CO$_2$ adsorbent in a method and plant for capturing of CO$_2$.

BACKGROUND

The continually increasing combustion of fossil fuel, such as coal, natural gas and oil, during the last centuries has resulted in an increase in the concentration of CO$_2$ in the atmosphere. The increasing concentration of CO$_2$ has caused concern due to the greenhouse effect caused by CO$_2$. The greenhouse effect is suspected already to have caused at least some of the changes in the climate that have been seen during the last decades, and is according to simulation models suspected to cause even more and potentially dramatic changes in the climate of planet earth.

This has caused a call for action from scientists, environmentalists and politicians throughout the world, to stabilize or even reduce the discharge of CO$_2$ from combustion of fossil fuel into the atmosphere. This may be achieved by capturing and safe depositing of CO$_2$ from the exhaust gas from thermal power plants and other plants where fossil fuel is combusted.

The captured CO$_2$ may be injected in sub terrain formations such as oil wells as pressure support for enhanced oil recovery or in depleted oil and gas wells for deposition. Tests indicate that CO$_2$ remains in the sub terrain formation for thousands of years and is not released into the atmosphere.

In prior art, capturing of CO$_2$ from a gas by means of absorption is well known and has been used for decades, e.g. for removal of CO$_2$ (and other acid gases) from produced natural gas at gas fields. The absorbents used or suggested in the prior art have been different aqueous alkaline solutions, such as potassium carbonate, see e.g. U.S. Pat. No. 5,528,811, and different amines, see e.g. U.S. Pat. No. 4,112,051, U.S. Pat. No. 4,397,660 and U.S. Pat. No. 5,061,465. Separation of CO$_2$ from exhaust gas from thermal power plants by means of an amine solution, is know e.g. from U.S. Pat. No. 4,942,734.

Common for these CO$_2$ capturing solutions is that the gas mixture to be separated is introduced countercurrent to the aqueous absorbent in an absorber column. The gas leaving the absorber column is CO$_2$ depleted (or acid gas depleted), whereas the CO$_2$ (or other acid gas) leaves the absorber column together with the absorbent. The absorbent is regenerated in a regenerator column and returned to the absorber column. Amine is regenerated by stripping the amine solution with steam in the regeneration column. The steam is generated by a reboiler at the base of the column.

Solid sorbents serve as alternatives to wet chemical absorbtion via the formation of carbamate species. However, since only the surface is involved in the reaction, the quantity of CO$_2$-reactive material that can be incorporated in the solid sorbent is limited by the specific surface area of the solid. In prior art, this severely restricts the amount of gases such as CO$_2$ that can be absorbed by the sorbents and gives rise to short breakthrough times.

Numerous solid sorbents for CO$_2$ removal have been developed over the years. O. Leal, et al., Inorganica Chimica Acta, 240, 183-189, 1995 have surface modified a silica gel using 3-aminopropyltriethoxysilane as the chemical moiety. The amine groups present at the solid surface after modification facilitates the CO$_2$ adsorption via formation of carbamate species.

U.S. Pat. No. 5,087,597 awarded to Leal, et al. on Feb. 11, 1992 discloses a method for the chemisorption of CO$_2$ at room temperature using a silica gel having a surface area of between 120 and 240 m2/g. The gel has been modified with a polyalcoxisilane containing one or more amino moieties in its structure.

U.S. Pat. No. 4,810,266 awarded to Zinnen et al. on Mar. 7, 1989 discloses a method for CO$_2$ removal using animated carbon molecular sieves that have been treated with alcohol amines.

There is still a need in prior art for solid phase improvement as well as the process accompanied with use of solid adsorption. The success of such technology is strongly dependent of good temperature durability, material strength, high adsorption capacity and reaction kinetics and good selectivity.

SHORT DESCRIPTION OF THE INVENTION

According to a first aspect, the present invention relates to a solid absorbent for absorption of CO$_2$ from flue gas, comprising:
 a. particles made of a cross bounded, highly porous polymer substrate, and
 b. CO$_2$ absorbing functional nucleophilic groups grafted on the particle surface.

A CO$_2$ absorbent made of particles being made of a cross bound, porous polymer substrate onto which CO$_2$ absorbing groups are grafted, gives an absorbent being highly effective as it has a high specific surface. As the absorbent is in particle form it may be fluidized for absorption and/or regeneration of the absorbent.

According to one embodiment, the CO$_2$ absorbing functional groups are amines selected from the group consisting of a primary amine, a secondary amine, a tertiary amine, an aromatic amine, or a cyclic amine and combinations thereof. Amines are known to be effective CO$_2$ absorbing groups from aqueous solutions.

According to a specific embodiment, the particles are superparamagnetic. Superparamagnetic particles may be separated from a medium where they are fluidized, and concentrated for regeneration by means of magnetic separators, to make concentration and isolation of the particles easy.

According to a second aspect, the invention relates to a method for removing CO$_2$ from a gas phase, wherein the gas phase is brought in contact with a liquid suspension of a solid absorbent according as described above.

According to a specific embodiment, the solid absorbent is concentrated by separation from water, before the absorbent is regenerated. Concentration of the particles or separation of the particles from water in which they are fluidized, reduces the amount of water that has to be heated in the regeneration process and thus saves energy.

According to one embodiment, the solid absorbent is separated from water by means of magnetic separation. Magnetic separation is a very effective and rapid way of separating the particles from the water the beads are suspended in

SHORT DESCRIPTION OF THE FIGURES

Figure 2:
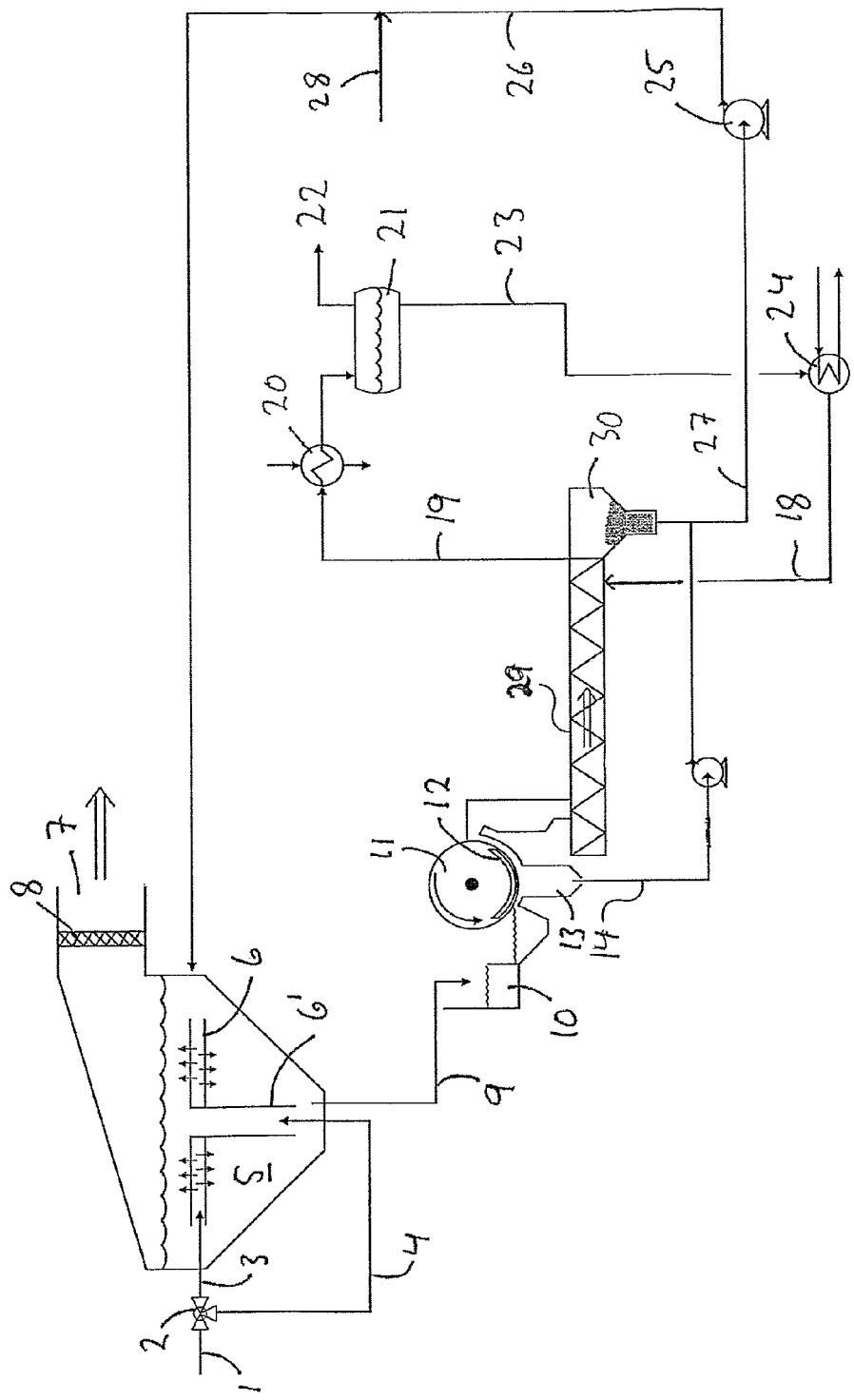

FIG. 1 illustrates a wet contactor type for CO$_2$ adsorption and a stripping column type for regeneration, and FIG. 2 illustrates a wet contactor type for $CO_2$ adsorption and a hollow screw conveyor for regeneration.

DETAILED DESCRIPTION OF THE PRESENT INVENTION

The invention build upon use of porous particles for $CO_2$ removal from flue gas. The particles are preferably porous particles, that are dispersed/dispersible in a liquid carrier. The preferred liquid carrier is water.

The particles may be of any suitable material, such as silica gels or a polymeric material showing a good temperature durability, material strength, high adsorption capacity and reaction kinetics as well as good selectivity. The presently preferred material for the particles is polymers such as e.g. cross bounded polystyrene beads, typically divinyl benzene (DVB) and ethyl vinyl benzene (EVB) mixed with Styrene and polymerized in the presence of a pore promoting agent, also called a porogene. The porogene may be chosen to create the required porosity, and comprises typically a non-polar, non-protogenic solvent, such as toluene and hexane, or a mixture thereof. The particles are preferably beads, and may according to one embodiment be monodisperse beads as further described e.g. in EPC 0003905 (Ugelstad).

The size of the beads can vary between 0.1 and 1000 µm, generally between 0.5 µm and 25 µm, more typically between 2 and 5 µm. The specific surface area of such beads may vary from about 1 to 1000 $m^2$/gram. Typically, a coated bead having a diameter of 2.8 µm has a specific surface area in the range of 4-5 $m^2$/gram. Coated monodisperse particles with a diameter of 2.8 µm having a density of ~2 gram/$cm^3$ have typically a specific surface area of ~4 $m^2$/gram resulting in a total surface area of about $8*10^6$ $m^2$/$m^3$ particles. Use of uncoated beads show a 20-fold increase in specific surface area, to typically give a specific surface area in the range of 50-500 $m^2$/gram.

The particles are preferably functionalised with functional groups suitable for $CO_2$ removal from flue gas. The functional groups used for functionalising the particles may be any groups that are known to absorb $CO_2$ reversibly and that may be grafted on the particles. The presently preferred functional groups are amines such as primary, secondary or tertiary amines. Examples on suitable amines are MEA, DEA, AMP, MDEA. The high specific surface area leads to a very high capacity with respect to grafting functional groups on the bead surface.

According to a preferred embodiment, the particles are magnetized. Typically, the particles are nitrated in an acid solution and thereby magnetized by adding a mixture of ammonia and iron sulphate. The resulting magnetic domains are very small consisting of maghemite or magnetite. The magnetic domains are, however, so small there is no remanence and the beads are therefore easy to fully disperse in a medium.

The $CO_2$ containing gas, or flue gas to be treated for removal of $CO_2$ is brought in contact with a liquid, preferably aqueous suspension of the present particles. The contact between the gas to be treated and the liquid suspension of the present particles is carried out in a contact device, such as e.g. a packed contact device where the liquid suspension and the gas is flows counter currently, or a turbulent bed absorber, where the gas is bubbled through the liquid suspension. $CO_2$ is very rapidly dissolved in water and the solid-phase extraction of $CO_2$ from the water phase to bead surface is in general very efficient. It is assumed that one of the main driving factors for solid phase absorption are hydrophobic interactions, which cannot be utilised in a simple liquid-gas extraction as described as the known technology above.

EXAMPLE

FIG. 1 illustrates a plant for $CO_2$ removal from an exhaust gas, or flue gas, by means of superparamagnetic $CO_2$ absorbent particles. The flue gas is introduced through a flue gas line 1. The gas entering though the gas line 1 is split in a three way valve 2, in an upper inlet line 3 and a lower inlet line 4 that lead into a turbulent bed absorber 5. The turbulent bed absorber 5 is partly filled with an aqueous suspension of $CO_2$ absorbing particles. The gas that is introduced through the upper inlet line 3 is introduced into a sieve tray 6. The gas that is introduced through the lower inlet line between parallel plates 6' and produces a gas lift which ensures circulation of the absorbent particles and a thorough mixing of the absorbent particles and exhaust gas entering the absorber 5.

The actual design of the turbulent bed reactor used will depend on the $CO_2$ removal specification and thereby the number of theoretical steps needed given by the equilibrium and operational curve. One possible design for the absorber is a Flowpack absorber from Alstom that is substantially as described with reference to absorber 5.

The non-absorbed flue gas, being $CO_2$ depleted, is released from the turbulent bed and is released into the surroundings through a gas outlet 7. A demister 8 is preferably arranged in the gas outlet to stop droplets to be brought out in the surroundings together with the $CO_2$ depleted flue gas. A wash section may also be required to ensure that there is no emission of chemicals that build up in the carrying liquid.

The bead suspension is drained through an absorbent drainage line 9 and introduced into an absorbent vessel 10. The bead suspension is forced to flow through an aperture between an outer wall of the absorbent vessel 10 and a rotating separation drum 11. A magnet 12 arranged within a sector of the circumference of the drum 11 causes the beads to stick at the wall of the drum 11, whereas the water is drawn by the gravity down into a water funnel 13. The water collected in the water funnel is withdrawn through a water drainage line 14.

The magnet 12 is arranged only in a sector of the circumference of the drum. The magnetic beads that are not attracted by the magnet 12 will be released from the surface of the drum and are collected at transporting means 15, such as conveyors. The step for concentration of the beads, or separation of beads and water, is fast and requires a minimum of power. After concentration only a minor portion of the water is left together with the beads.

The beads are then introduced into a regenerator 16, such as a spray tower, into which the particles are sprayed by means of spraying means 17 and are regenerated by countercurrent flow against steam that is introduced into the bottom part of the regenerator through steam line 18, to release $CO_2$ from the beads. Released $CO_2$ and steam is withdrawn through a withdrawal line 19, before the mixture of $CO_2$ and steam is cooled by means of a cooler 20 and separated into $CO_2$ and water in a condenser 21.

The $CO_2$ is withdrawn from the flash tank through a $CO_2$ withdrawal line for further treatment and export from the plant. The water is withdrawn from the condenser in water line 23, and is heated in a reboiler 24 to produce steam that is introduced into the regenerator through steam line 18.

Regenerated particles are withdrawn from the bottom of the regenerator in a particle withdrawal line 27 and mixed with the water in line 14, before it is pumped by means of a pump 25, and reintroduced into the turbulent bed absorber 5 through an absorber return line 26. Additional water to make up for water loss is introduced into line 26 through a make-up water line 28.

In the illustrated plant, the suspension is withdrawn from the turbulent bed absorber at a continuous rate to give a continuous operation. A batchwise operation is also possible, but will require a plurality of absorbers in parallel.

FIG. 2 illustrates an alternative plant, where the main difference from the plant according to FIG. 1, is that the regenerator is of an alternative type, where the particles are regenerated in a jacketed steam heated hollow screw conveyor type of regenerator 29. Steam is introduced through line 18 to give a countercurrent stream of steam in the screw conveyor 29 to liberate $CO_2$ from the particles to regenerate the particles. The liberated $CO_2$ and steam is withdrawn from the screw conveyor through line 19 and The pressure in the regenerator is in the order of 0.6 bara, and the is about 100° C.

The regenerated particles leaving the regenerator is collected in a funnel 30 and are mixed with the water in line 14, before it is pumped by means of a pump 25, and reintroduced into the turbulent bed absorber 5 through an absorber return line 26. Additional water to make up for water loss is introduced into line 26 through a make-up water line 27.

The features and elements that are in common for FIGS. 1 and 2 and that have the same reference numerals are substantially as described with reference to the description of FIG. 1, if not otherwise indicated.

The amount of energy required in both embodiments, will be significantly reduced compared to standard MEA process as most of the water will be removed prior to steam stripping. A total power saving of 35-50% compared to a standard MEA plant (35% MEA) is expected.

The invention claimed is:

1. A method comprising:
   removing $CO_2$ from a gas phase, wherein the gas phase is brought in contact with an aqueous suspension of superparamagnetic particles made of a cross-bounded, porous polymer substrate, having $CO_2$ absorbing functional nucleophilic groups grafted on a particle surface, where an absorbent is concentrated by magnetic separation of water and particles, and where the absorbent thereafter is regenerated by heating to release $CO_2$ that is withdrawn and treated further for export from a plant.

2. The method of claim 1, wherein the $CO_2$ absorbing functional groups are amines selected from the group consisting of a primary amine, a secondary amine, a tertiary amine, an aromatic amine, or a cyclic amine and combinations thereof.

3. The method according to claim 1, wherein the gas phase is brought in contact by countercurrent flow to the aqueous suspension.

4. The method according to claim 1, wherein the magnetic separation is performed in a rotary separator.

* * * * *

UNITED STATES PATENT AND TRADEMARK OFFICE
CERTIFICATE OF CORRECTION

PATENT NO. : 8,454,726 B2
APPLICATION NO. : 12/919387
DATED : June 4, 2013
INVENTOR(S) : Thomas Ranes Haugan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 369 days.

Signed and Sealed this
Eighth Day of September, 2015

Michelle K. Lee
*Director of the United States Patent and Trademark Office*